United States Patent
Jenkins et al.

(10) Patent No.: US 8,165,433 B2
(45) Date of Patent: Apr. 24, 2012

(54) OPTICAL ROUTING DEVICE COMPRISING HOLLOW WAVEGUIDES AND MEMS REFLECTIVE ELEMENTS

(75) Inventors: Richard M Jenkins, Malvern (GB); Mark E McNie, Malvern (GB); David J Combes, Malvern (GB); James McQuillan, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 12/923,656

(22) Filed: Sep. 30, 2010

(65) Prior Publication Data

US 2011/0164845 A1   Jul. 7, 2011

Related U.S. Application Data

(63) Continuation of application No. 10/548,665, filed as application No. PCT/GB2004/001213 on Mar. 22, 2004, now abandoned.

(30) Foreign Application Priority Data

Mar. 22, 2003 (GB) .................................. 0306638.8

(51) Int. Cl.
*G02B 6/35* (2006.01)
*G02B 6/20* (2006.01)
(52) U.S. Cl. ............... 385/18; 385/16; 385/17; 385/125
(58) Field of Classification Search .................. None
See application file for complete search history.

(56) References Cited

U.S. PATENT DOCUMENTS

| | | |
|---|---|---|
| 4,068,920 A | 1/1978 | Bass et al. |
| 4,453,803 A | 6/1984 | Hidaka et al. |
| 5,428,698 A | 6/1995 | Jenkins et al. |
| 6,002,514 A | 12/1999 | Baxter et al. |
| 6,163,643 A | 12/2000 | Bergmann et al. |
| 6,219,470 B1 | 4/2001 | Tu |
| 6,315,462 B1 | 11/2001 | Anthamatten et al. |
| 6,477,290 B1 | 11/2002 | Wan et al. |
| 6,501,869 B1 | 12/2002 | Athale |
| 6,839,478 B2 | 1/2005 | Huber |
| 7,103,242 B2 | 9/2006 | Gopalkrishna |
| 2002/0102059 A1 | 8/2002 | Cho |
| 2002/0191907 A1 | 12/2002 | Ido et al. |
| 2003/0035613 A1 | 2/2003 | Huber et al. |

(Continued)

FOREIGN PATENT DOCUMENTS

DE   35 42 614   6/1987

(Continued)

OTHER PUBLICATIONS

International Search Report of PCT/GB2004/001213, mailed Jul. 21, 2004.

(Continued)

*Primary Examiner* — Tina Wong
(74) *Attorney, Agent, or Firm* — Nixon & Vanderhye, PC

(57) ABSTRACT

An optical routing device is described that comprises a semiconductor substrate (52) having at least one optical input (4), a plurality of optical outputs (6,8) and an array of MEMS moveable reflective elements (58;102). The array of moveable reflective elements (58;102) are configurable such that light can be selectively routed from any one optical input (4) to any one of two or more of said plurality of optical outputs (6,8). Light selectively routed from any one optical input to any one of two or more of said plurality of optical outputs (6,8) is guided within a hollow core waveguide (54). In one embodiment, a cross-connect optical matrix switch is described.

21 Claims, 6 Drawing Sheets

U.S. PATENT DOCUMENTS

2003/0237370    2/2003    Helin

FOREIGN PATENT DOCUMENTS

| EP | 0 043 475 A1 | 1/1982 |
| EP | 0 128 800 A1 | 12/1984 |
| EP | 0 221 288 A1 | 5/1987 |
| EP | 0718657 | 6/1996 |
| EP | 1 413 912 | 4/2004 |
| GB | 2 014 752 A | 8/1979 |
| GB | 2 189 621 | 10/1987 |
| GB | 2 193 816 A | 2/1988 |
| WO | 01/38921 | 7/2000 |
| WO | 01/59492 | 10/2000 |
| WO | 00/75503 | 12/2000 |
| WO | 01/86825 A2 | 11/2001 |
| WO | 02/31551 A1 | 4/2002 |
| WO | WO 03/007052 | 1/2003 |
| WO | 03/065091 A2 | 8/2003 |

OTHER PUBLICATIONS

GB Search Report of GB 0306638.8 of May 13, 2003.

Patent Abstracts of Japan, vol. 21, No. 21, Oct. 12, 1978, JP 53 087746 A, Aug. 2, 1978.

Miura et al., "Hollow Optical Waveguide for Temperature-Insensitive Photonic Integrated Circuits", Japanese Journal of Applied Physics, Publication Office Japanese Journal of Applied Physics, vol. 40, No. 7A, Part 2, Jul. 1, 2001, pp. L688-L690, XP001077922.

Wood et al., "MEMS 2D Matrix Switch", Mar. 17, 2002, pp. 91-92, vol. 1, XP002286382.

Patent Abstracts of Japan, JP 3025815A, Feb. 4, 1991.

Li et al., "Advanced fiber optical switches using deep RIE (DRIE) fabrication", Sensors and Actuators A, 2003, vol. 102, No. 3, pp. 286-295, XP004399072.

Miura et al., "Modeling and Fabrication of Hollow Optical Waveguide for Photonic Integrated Circuits", Japanese Journal of Applies Physics, vol. 41, No. 7B, Part 1, Jul. 2002, pp. 4785-4789.

Takahashi et al., "Transmission Characteristics of Arrayed Waveguide N×N Wavelength Multiplexer", Journal of Lightwave Technology, IEEE, vol. 13, No. 3, Mar. 1, 1995, pp. 447-455, XP000509310.

Jenkins et al., "An Integrated Optic Approach to 10/spl mu/m LIDAR", Conference on Lasers and Electro-optics in Europe, Sep. 14, 1998, pp. 389-389, XP010617541.

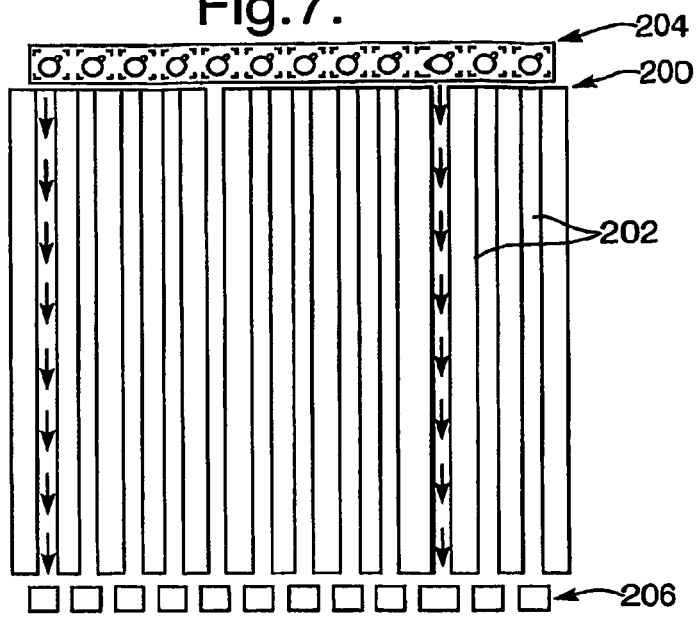
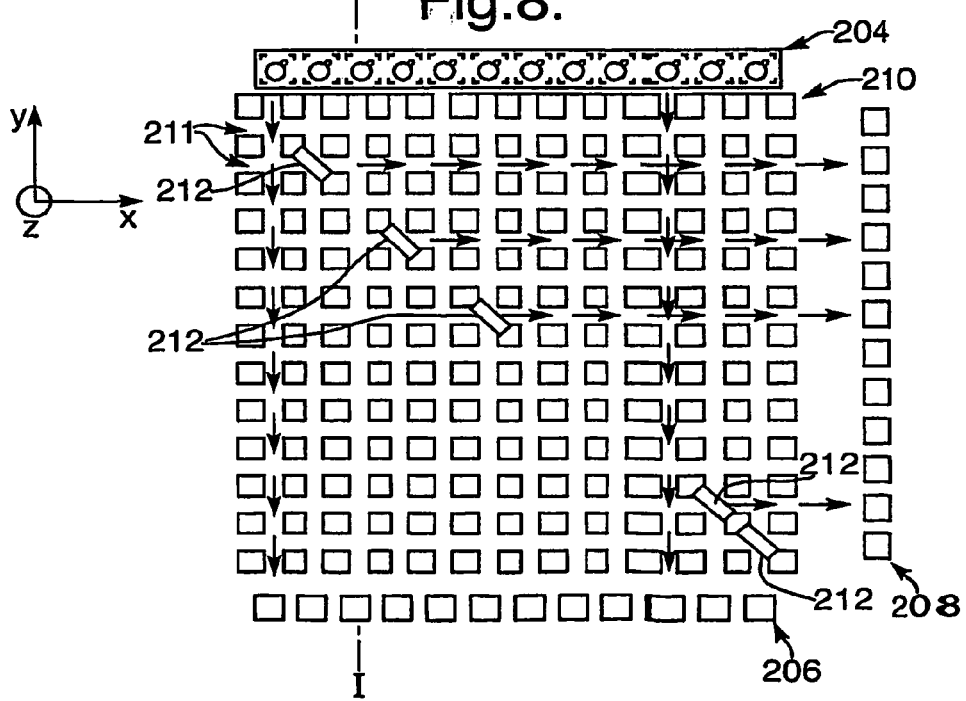

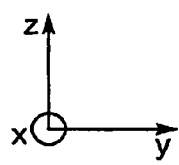
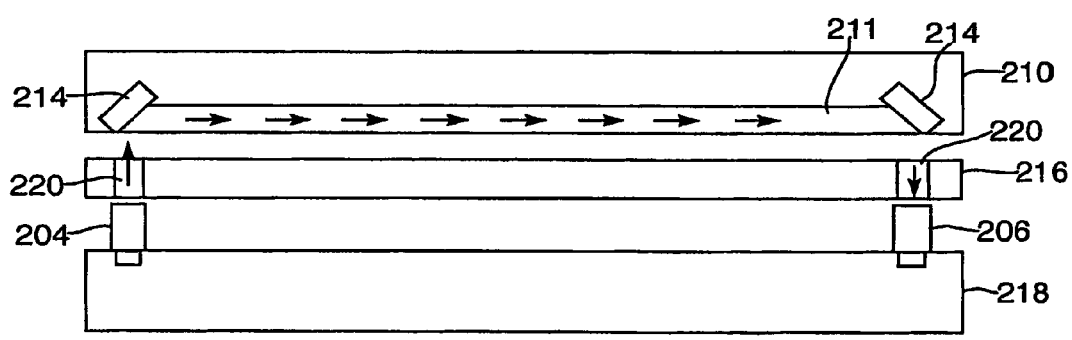
Fig.9.

OPTICAL ROUTING DEVICE COMPRISING HOLLOW WAVEGUIDES AND MEMS REFLECTIVE ELEMENTS

This application is a Continuation of application Ser. No. 10/548,665, filed Sep. 9, 2005 now abandoned, which is the US national phase of international application PCT/GB2004/001213 filed Mar. 22, 2004, which designated the US. PCT/GB2004/001213 claims priority to GB Application No. 0306638.8, filed Mar. 22, 2003. The entire contents of these applications are incorporated herein by reference.

This invention relates to optical routing devices for use in telecommunication systems and the like, and in particular to an optical routing device incorporating an array of moveable reflective elements.

Telecommunication and data networks are increasingly being implemented using optical fibre links. Traditionally, the optical signals carried by the fibres were converted to electrical signals and any signal routing functions performed in the electrical domain. However, in recent years it has been recognised that all-optical switching devices offer the potential to reduce the cost and complexity associated with routing signals across optical fibres networks.

An early example of an all-optical switch is described in EP0221288. The arrangement comprises a mirror that can be moved by an electromagnetic actuator to route an optical signal to either one of two outputs. An alternative and more complex optical switching system is described in GB2193816. The system of GB2193816 comprises a housing block having multiple hollow core waveguides and control rods that carry mirrors which are inserted into the block to provide a desired optical routing function. However, devices of this type are physically large and, in the case of EP0221288, require relatively power hungry actuators.

Optical routing devices are also known in which micro-electro-mechanical system (MEMS) devices are used to provide a selective routing capability. For example, a MEMS based two dimensional matrix switch is described by Wood, R. L., Madadevan, R and Hill, E in paper TU05 of the proceedings of the Optical Fibre Communications Conference, March 2002, Los Angeles, USA. The device comprises a two dimensional array of pop-up MEMS mirrors that are magnetically rotated into the "up" state and held there electrostatically. The arrangement allows a free space input light beam to be selectively routed from a "through" channel to any one of a number of "cross" channel. In this manner, a two dimensional matrix switch is provided.

A disadvantage of optical devices of the type described by Wood et. al. is the high level of optical loss that is associated with the inclusion of the free space region in which the MEMS mirrors are located. In particular, diffraction effects result in an increase of the beam diameter as it propagates along each free space path. This reduces the efficiency with which light is subsequently coupled into an output optical fibre. In addition, any angular misalignment of the MEWS mirror will produce an lateral offset in the optical beam. Angular misalignment effects of this type are cumulative; in other words, the lateral offset is amplified when light is reflected from multiple misaligned mirrors. This further decreases the coupling efficiency into an output optical fibre.

An alternative MEMS based optical routing devices is described in US2003/0035613. The device of US2003/0035613 comprises upper and lower layers in which hollow core multi-mode optical waveguides are formed. The hollow core waveguides of the upper and lower layers are arranged to overlap and flexible metal levers are provided in the vicinity of the overlapping waveguide regions. The metal levers can be deformed to guide light out of a waveguide formed in, say, the lower layer to a waveguide of the upper layer. In this manner, an optical routing function is obtained. However, accurate alignment of the upper and lower layers and providing mechanically robust and reliable flexible levers makes the fabrication of such a device rather complex.

It is an object of the invention to mitigate at least some of the disadvantages described above.

According to the present invention, an in-plane optical routing device comprises a semiconductor substrate having at least one optical input, a plurality of optical outputs and an array of micro-electromechanical system (MEMS) moveable reflective elements, said array of moveable reflective elements being configurable such that light can be selectively routed from any one optical input to any one of two or more of said plurality of optical outputs, characterised in that light selectively routed from any one optical input to any one of two or more of said plurality of optical outputs is guided within a hollow core waveguide.

A device of the present invention thus provides a so-called matrix switch in which light is selectively routed from at least one input to any one of two or more outputs using an array of MEMS moveable reflective elements. The various optical paths between the input(s) and outputs comprise hollow core optical waveguides and lie in a plane that is substantially parallel to the plane of the substrate; i.e. the device is an "in-plane" optical routing device. The optical muting device of the present invention may be a standalone component, or may form part of a planar light circuit (PLC) of the type described in PCT patent application GB2003/000331.

A device of the present invention is advantageous over prior art matrix switch devices of the type described previously by Woods et. al. because guiding light to, and from, the MEMS moveable reflective elements within a hollow core waveguide reduces unwanted beam attenuation from free-space diffraction and angular misalignment effects. The reduced losses due to the guiding effect of the hollow core waveguide also enable the separation between reflective elements in the array, and the numerical order of the array, to be increased. The device of the present invention is especially advantageous when used with small diameter beams where diffraction effects in a free space device would be proportionally greater. It should also be remembered that an angular misalignment error in a device of the type described in Woods et al will be amplified by any subsequent reflections from further mis-aligned mirrors. In contrast, angular misalignment of a reflective element in a device of the present invention imparts a certain coupling loss depending on the mount of misalignment; any such misalignment error is not amplified by subsequent reflections.

The device of the present invention is also significantly less complicated to fabricate and more mechanically robust than dual plane hollow core waveguide devices of the type described in US2003/0035613. It should also be noted that the device described in US2003/0035613 only supports multi-mode propagation and is thus inherently more lossy than a device of the present invention.

In order for a device of the present invention to provide certain routing functions, it may be necessary for there to be some gaps in the side walls that define the hollow core waveguide. Although the non-guided regions can be arranged to constitute only a small proportion of the waveguide, the gaps may slightly increase the optical loss of the waveguide. However, this effect is negligible and even with such gaps the hollow core waveguides provide reduced losses compared with prior art free space propagation devices.

It should be noted that when hollow core optical waveguide structures are produced, the hollow core is likely to fill with air. However, this should be seen in no way as limiting the scope of this invention. The hollow core may contain any fluid (for example a liquid or an inert gas such as nitrogen) or be a vacuum. The term hollow core simply means a core which is absent any solid material. Furthermore, the terms "light" and "optical" are used herein to refer to any electromagnetic radiation having a wavelength from the ultraviolet to the far infra-red.

Semiconductor substrates, such as Silicon, are preferred because they can be etched with good accuracy using micro-fabrication techniques such as deep reactive ion etching. The substrate may advantageously comprise a multiple layer wafer, for example silicon on germanium (SiGe), silicon on sapphire, silicon-on-insulator (SOI) or silicon-on-glass. A person skilled in the art would recognise that micro-fabrication techniques typically involve a lithography step to define a pattern, followed by an etch step to transform the pattern in to one or more layers on, or in, the substrate material. The lithography step may comprise photolithography, x-ray or e-beam lithography. The etch step may be performed using ion beam milling, a chemical etch, a dry plasma etch or a deep dry etch (also termed deep silicon etch). Micro-fabrication techniques of this type are also compatible with various layer deposition techniques such as sputtering, CVD, electro-less plating and electro-plating.

Advantageously, the semi-conductor substrate comprises a base portion and a lid portion which together define the hollow core waveguide. Such an arrangement is described in more detail in PCT patent application GB2003/000331 and provides a convenient way to fabricate the device.

The choice of MEMS moveable reflective element depends on the speed and amount of movement required. The reflective element may be formed as an integral part of MEMS actuation device, or may be attached to the MEMS actuator. Herein, MEMS is taken to include micro-machined elements, micro-systems technology, micro-robotics and micro-engineering and the like. The MEMS moveable reflective elements may advantageously comprise an electro-thermal actuation mechanism (e.g. a bent beam arrangement) to provide large throw (e.g. 5-100 μm full scale deflection) actuation. Alternative actuation mechanisms such as electromagnetic, electrostatic (e.g. comb drive), or piezoelectric may also be used. More detail on MEMS device actuation technologies and the associated fabrication techniques can be found in "Fundamental of Microfabrication" by Marc Madou, published by CRC Press (Boca Raton) in 1997; ISBN 0-8493-9451-1.

Preferably, the MEMS moveable reflective elements comprise a reflective coating. The reflective coating may be provided by any material having suitable reflective properties at the wavelength of operation. To provide reflection by internal reflection, a material having a refractive index less than the material forming the waveguide core (typically air) could be used. For example, the reflective coating may conveniently be provided by a layer of metal such as gold, silver or copper. Metals will exhibit a suitably low refractive index over a wavelength range that is governed by the physical properties of the metal; standard text books such as "the handbook of optical constants" by E. D. Palik, Academic Press, London, 1998, provide accurate data on the wavelength dependent refractive indices of various materials. In particular, gold has a refractive index less than that of air at wavelengths within the range of around 500 nm to 2.2 μm; this encompasses wavelengths within the important telecommunications band of 1400 nm to 1600 nm.

Copper exhibits a refractive index less than unity over the wavelength range of 560 nm to 2200 nm, whilst silver has similar refractive index properties over a wavelength range of 320 nm to 2480 nm.

A layer of metal may be deposited using a variety of techniques known to those skilled in the art. These techniques include sputtering, evaporation, chemical vapour deposition (CVD) and (electro or electro-less) plating. CVD and plating techniques allow the metal layers to be deposited without significant direction dependent thickness variations. Sputtering using a rotating sample and/or source would also provide even coverage. Plating techniques are especially advantageous as they permit batch (i.e. multi-substrate parallel), processing to be undertaken.

A skilled person would recognise that adhesion layers and/or barrier diffusion layers could be deposited on the reflective element prior to depositing the layer of metal. For example, a layer of chrome or titanium could be provided as an adhesion layer prior to the deposition of gold. A diffusion barrier layer, such as platinum, may also be deposited on the adhesion layer prior to gold deposition. Alternatively, a combined adhesion and diffusion layer (such as titanium nitride, titanium tungsten alloy or an insulating layer) could be used.

The reflective coating may also be provided by an all-dielectric, a semiconductor-dielectric or a metal-dielectric stack. A person skilled in the art would recognise that the optical thickness of the dielectric layer(s) provides an interference effect that will determine the reflective properties of the coating. The dielectric material may be deposited by CVD or sputtering or reactive sputtering. Alternatively, a dielectric layer could be formed by chemical reaction with a deposited metal layer. For example, a layer of silver could be chemically reacted with a halide to produce a thin surface layer of silver halide.

In other words, the reflective coating may be provided by an all-dielectric, a semiconductor-dielectric or a metal-dielectric, stack. A person skilled in the art would recognise that the optical thickness of the dielectric layer(s) gives the required interference effects and thus determines the reflective properties of the coating. The reflective properties of the coating may also be dependent, to some extent, on the properties of the material on which it is located. Hence, the material from which the reflective element is formed may also form a base layer, and be a part of, any such multiple layer dielectric stack.

Conveniently, the internal surface of the hollow core waveguide comprises a reflective coating. The reflective coating applied to the internal surface of the hollow core waveguide may be a metal or a dielectric or a metal-dielectric stack of the type described above. Any coating applied to the internal surface of the hollow core waveguide may be the same as, or different to, any coating applied to the moveable reflective elements.

Conveniently, at least one of the MEMS moveable reflective elements is a pop-up mirror. For example, an electromagnetic pop-up mirror of the type described by Wood et al could be used. Alternatively, at least one of the MEMS moveable reflective elements may advantageously comprise a shutter. The shutter may be formed integrally with, or attached to, an appropriate actuation mechanism. The shutter could be also formed as a "flip-up" structure which removes geometrical constraints on shutter edge shape. It should be noted that, as described in more detail below, the use of hollow core waveguides enables the MEMS moveable reflective elements to be fabricated with reduced alignment tolerances.

Preferably, each MEMS moveable reflective element is formed monolithically with the hollow core waveguides. In this manner, the MEMS element is formed in the same process as the hollow core waveguide thereby providing a simple way to produce a device without requiring additional processing or device assembly. Alternatively, MEMS moveable reflective elements could advantageously be formed in a separate process and hybrid integration techniques used to attach it to the substrate in which the hollow core waveguide is formed.

As noted above, the provision of hollow core optical waveguides to optically link the MEMS moveable reflective elements will reduce the optical losses associated with a given angular misalignment of the reflective elements. Alternatively, hollow core optical waveguide could be used to reduce the required angular alignment accuracy of the MEMS moveable reflective elements whilst providing a device with a given optical efficiency.

Conveniently, each moveable reflective device is moveable between a fully (or partly) inserted position in which it protrudes into the hollow core waveguide, and a fully retracted position. Alternatively, the reflective device could be moveable between two different positions within the waveguide.

The moveable reflective elements are advantageously arranged in a regular array. The array may be regularly spaced, or may be any arrangement that provides the desired routing effect. Linear (i.e. one dimensional) or two dimensional arrays may be used. Preferably, the array comprises sixteen or more moveable reflective devices. It is also possible to stack a number of the in-plane devices and provide linking waveguides between each two dimensional array in the stack.

In a preferred arrangement, the plurality of optical outputs include at least one through output and at least one cross output. The MEMS moveable reflective elements can, in the inserted position have a reflective surface angled at approximately 45° to the "through" and "cross" hollow core waveguide channels. In this way, the device can be arranged such that when the moveable reflective elements are retracted light is routed from the at least one input to the at least one through output and when a mirror is inserted light is routed from the input to the associated cross output. In other words, a two-dimensional cross switch can be fabricated. Such a cross-switch would have an optical attenuation lower than prior art devices of the type described by Wood et al.

Conveniently, at least one of said at least one optical input and plurality of optical outputs comprise a means for receiving an optical fibre. For example, the means for receiving an optical fibre may comprise an alignment slot formed in the device that is arranged to clamp an optical fibre in place thereby allowing optical connection to the device. In the case of solid core fibres, stepped optical fibre alignment slots may be provided to hold both the buffer layer and the cladding. The alignment of the core of a hollow core optical fibre with the hollow core waveguide of the device may also be achieved; for example by clamping the optical fibre cladding in a alignment slot. The use of hollow core optical fibres would be especially advantageous as the air core to air core connection would be free from any unwanted reflections.

At least one of said optical input and/or said optical outputs may conveniently comprise an out of plane reflector element. In this manner, a plurality of devices of the present invention may be arranged in a stack.

To provide efficient coupling between the core of an optical fibre and a hollow core waveguide of the device, the cross-section of the hollow core waveguide should be appropriate for the cross-section of the optical fibre core. In the case of solid core fibres, leakage into the cladding means that the width of the mode carried by the fibre is actually greater than the core diameter, for example typically the 10 μm solid core of a single mode glass fibre has a total $1/e^2$ $TEM_{00}$ field width of around 14 μm diameter. If the mode width is different to that of the hollow core waveguide, lenses (e.g. ball or GRIN rod etc) can be used to expand or reduce the optical field to enable light to be coupled to/from fibres with a different size core to that of the hollow core waveguide of the PLC. Fibre ends of solid core fibres may be anti-reflection coated.

Lensed fibres may also be used which would negate the requirement for separate collimating means to coupled the light into the hollow core waveguides of the device.

Advantageously, portions of the one or more hollow core optical waveguides have a substantially rectangular (which herein shall include square) cross-section. A square, or almost square, cross-section hollow core waveguide provides a waveguide in which the losses are substantially polarisation independent and is preferred when the polarisation state of the light is unknown or varying. Dimensioning the waveguide to have a depth greater than its width or vice versa increases polarisation dependent losses, but may be advantageous when the polarisation state of light propagating through the waveguide is known.

Although rectangular cross-section waveguides are convenient, many alternative waveguide shapes could be employed. For example, circular, elliptical or v-shaped waveguides could be provided.

Conveniently, the hollow core waveguides are dimensioned to support fundamental mode propagation. The present invention can provide accurate alignment of MEMS moveable reflective elements with respect to the associated hollow core optical waveguides and consequently efficient fundamental mode coupling between sections of hollow core optical waveguide can be achieved.

Alternatively, the hollow core waveguides may be dimensioned to support multi-mode propagation. If multi-mode hollow core wave guide structures are provided, adjacent moveable reflective elements can advantageously be spaced apart by the re-imaging distance of the hollow, core waveguide. The re-imaging phenomena, and details concerning calculation of the re-imaging distance for a given waveguide, are described in more detail below. In short, the re-imaging effect provides a replication of an input field a certain distance from the injection of the field into a multi-mode waveguide. Spacing the moveable reflective elements by the re-imaging distance of light propagating through the inter-connecting waveguide enables a re-imaging point to be located in the vicinity of the moveable reflective elements. This enable all the path lengths through the device to be a multiple of this re-imaging length. Hence, the input field from an input optical fibre to be replicated at any of the optical outputs thereby allowing efficient coupling of light into an output optical fibre. Use of the re-imaging effect also reduces diffraction losses where the waveguide has to be broken in order to facilitate the location of a moveable reflective element.

In summary, the invention provides an optical routing device that comprises at least one input connected via a plurality of optical paths to a plurality of outputs. The device has a plurality of reflective elements that can be moved to change the optical path through the device, and light is guided along each optical path in a hollow core waveguide.

It should be noted that although substrates comprising semiconductor materials are described above, similar devices could also be formed on a variety of alternative substrate. The substrate could advantageously be silicon oxide based; for example formed from quartz, silica or glass. Substrates could also be embossed, or patterns could be lithographically defined in polymer layers. From a manufacturing perspective, it can be advantageous to use batch micro-fabrication techniques.

The invention will now be described, by way of example only, with reference to the following drawings in which.

Figure 3:
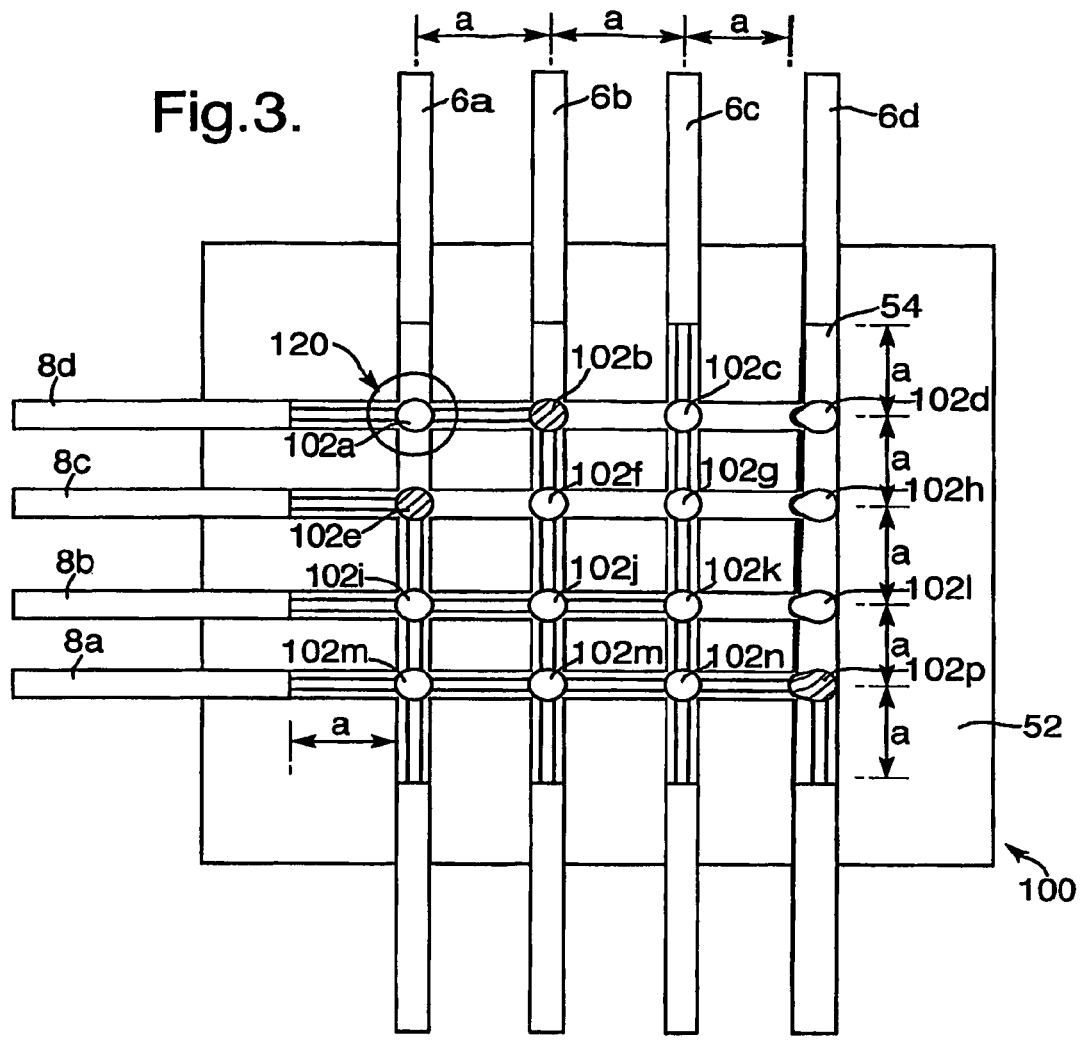
FIG. 3 shows a further matrix switch of the present invention that utilises the re-imaging effect.
Figure 4:
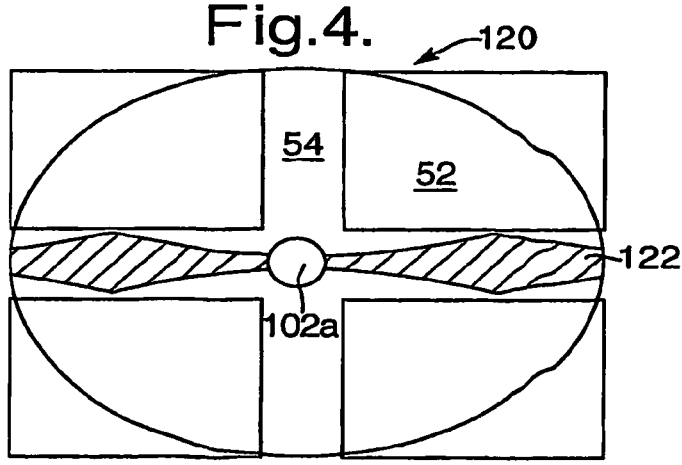
Figure 5:
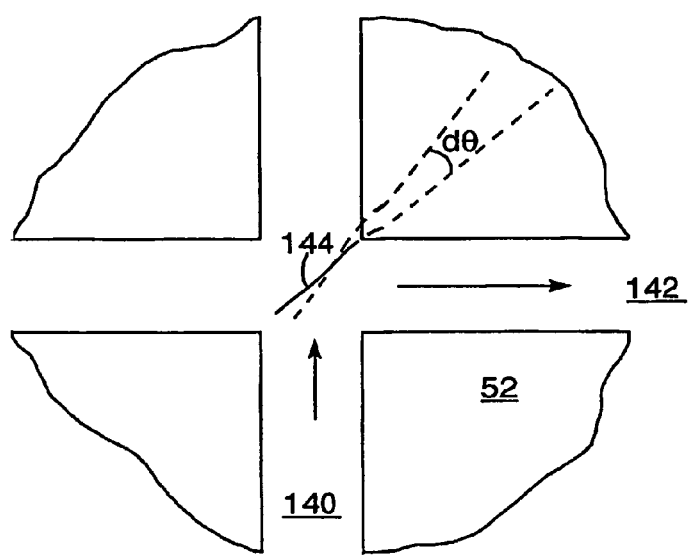
Figure 6:
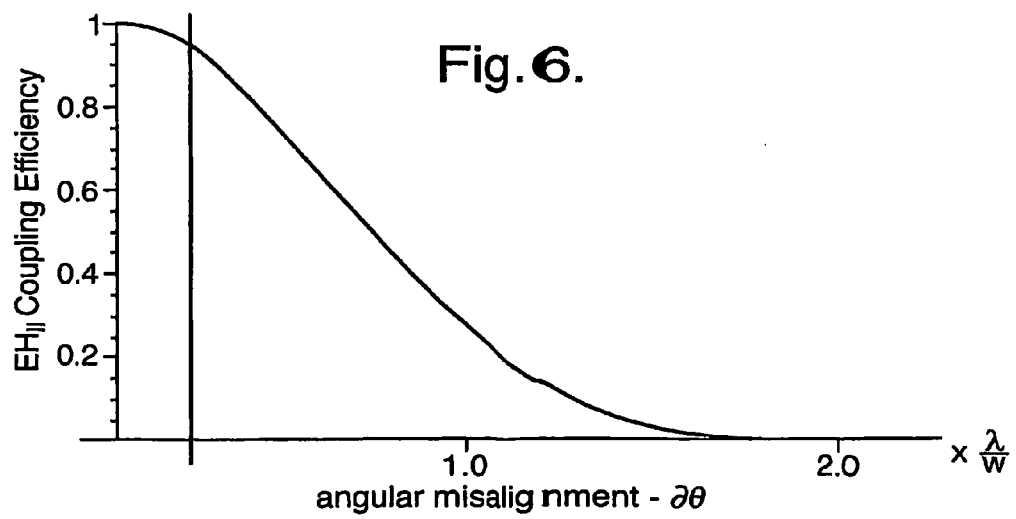

FIG. 4 provides an expanded view of a portion of the device shown in FIG. 3;

FIG. 5 illustrates the potential angular misalignment of reflective devices;

FIG. 6 shows the effect of such angular misalignment on the coupling efficiency between two sections of hollow core waveguide;

FIG. 7 illustrates the use of hollow core optical waveguides for intra-chip optical coupling, FIG. 8 shows a plan view of intra-chip optical coupling using a matrix switch; and FIG. 9 shows a side view of the coupling scheme of FIG. 8.

Figure 1:
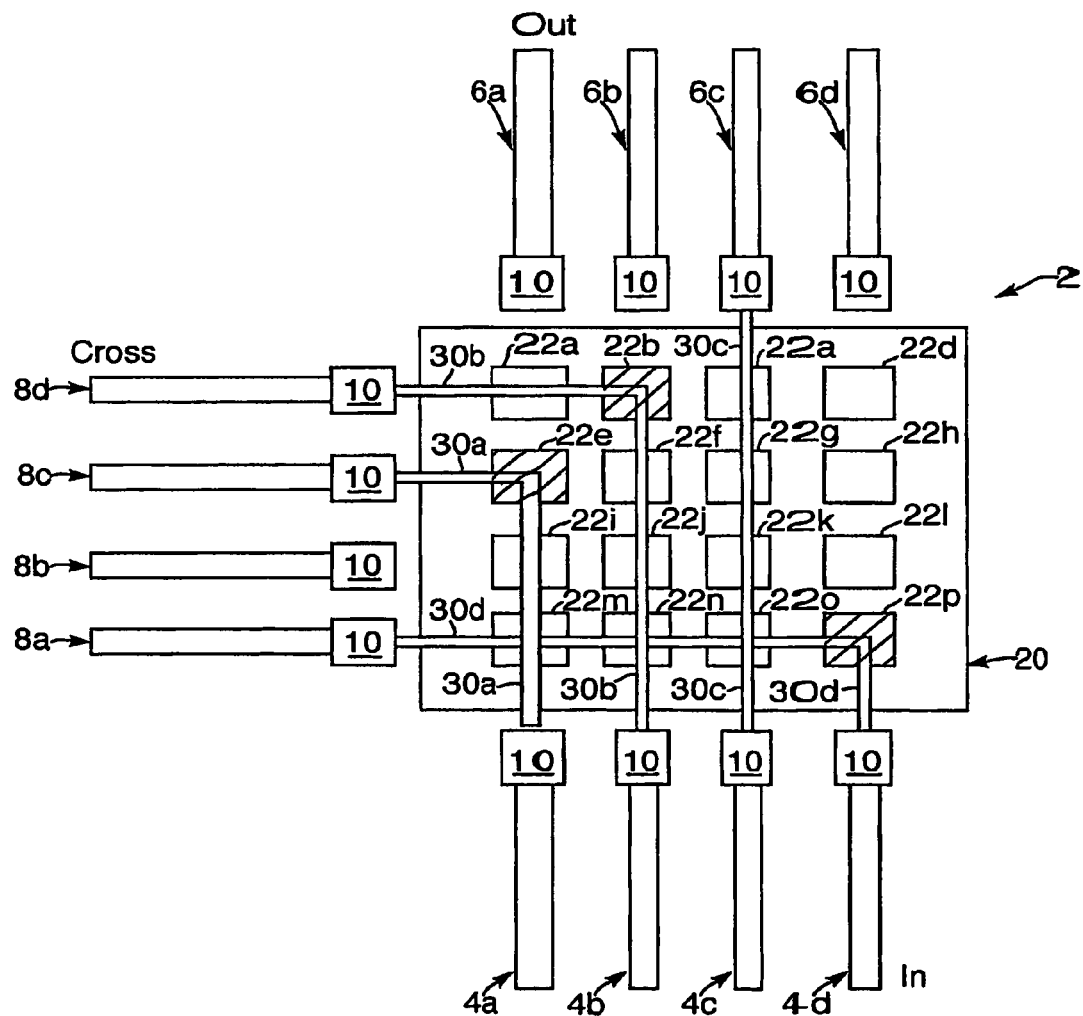
FIG. 1 shows a prior art matrix switch.

Referring to FIG. 1, a prior art matrix switch 2 shown.

The matrix switch 2 comprises four input optical fibres 4a to 4d (collectively referred to as the input fibres 4), four output optical fibres 6a to 6d (collectively referred to as the output fibres 6) and four cross-connect output optical fibres 8a to 8d (collectively referred to as the cross-connect output fibres 8). Each of the input fibres 4, output fibres 6 and cross-connect output fibres 8 have an associated collimating lens 10. A substrate 20 is provided that carries a four-by-four array of MEMS pop-Up mirrors 22a to 22p (collectively referred to as the MEMS array 22). Each mirror in the MEMS array 22 can be placed in a stowed configuration or an upright configuration by application of an appropriate control signal by an array control means (not shown).

The input fibres 4, output fibres 6 and substrate 20 are arranged such that, when each mirror in the MEMS array 22 is in a stowed configuration, the light from input fibre 4a propagates as a collimated beam in free space over the substrate and is directly coupled into the output fibre 6a. Similarly, light from input fibres 4b, 4c and 4d is arranged so as to be coupled into output fibres 6b, 6c and 6d respectively.

The substrate is also arranged such that any of the mirrors 22a, 22e, 22i and 22m can be inserted into the free space optical path that is defined between the input fibre 4-a and the output fibre 6a. The mirrors 22a, 22e, 22i and 22m are orientated such that when in the upright configuration; light is directed out of the optical path between the input fibre 4a and the output fibre 6a and towards the cross-connect output 8a, 8b, 8c or 8d as appropriate. In this manner, the light from each of the input fibres 4 may pass to its corresponding output fibre 6 or may be routed by the appropriate mirror of the MEMS array 22 to any one of the four cross-connect output fibres 8. A two dimensional matrix switch is thus formed.

In FIG. 1, the mirrors 22b, 22e and 22p are in the upright configuration whilst the remaining mirrors are in the stowed configuration. It can thus be seen that light beam 30a exits from input fibre 4a and is routed to cross-connect output 8c via mirror 22e. Light beam 30b is muted from input fibre 4b to cross-connect fibre 8d via mirror 22b, light beam 30c passes from input fibre 4c straight to output fibre 6c, whilst mirror 22p causes light beam 30d to be routed from input fibre 4d to cross-connect output fibre 8a. It would be immediately apparent to the skilled person that a large number of muting options are possible; namely, each input can pass to its associated output or it can be routed down any one of the cross-connect outputs.

As described above, prior art devices of the type illustrated in FIG. 1 have several disadvantages arising from the free-space propagation of light between the input and output fibres. In particular, and despite the provision of the collimating lenses 10, beam diffraction causes the beam diameter to increase as it propagates through the matrix which results in poorer coupling to output fibre. Furthermore, any inaccuracy in angular alignment of a MEMS mirror causes a lateral offset at the output plane resulting in the poor coupling of light in to the relevant output fibre. These problems are exacerbated for the longer paths associated with higher numerical order switches.

Figure 2:
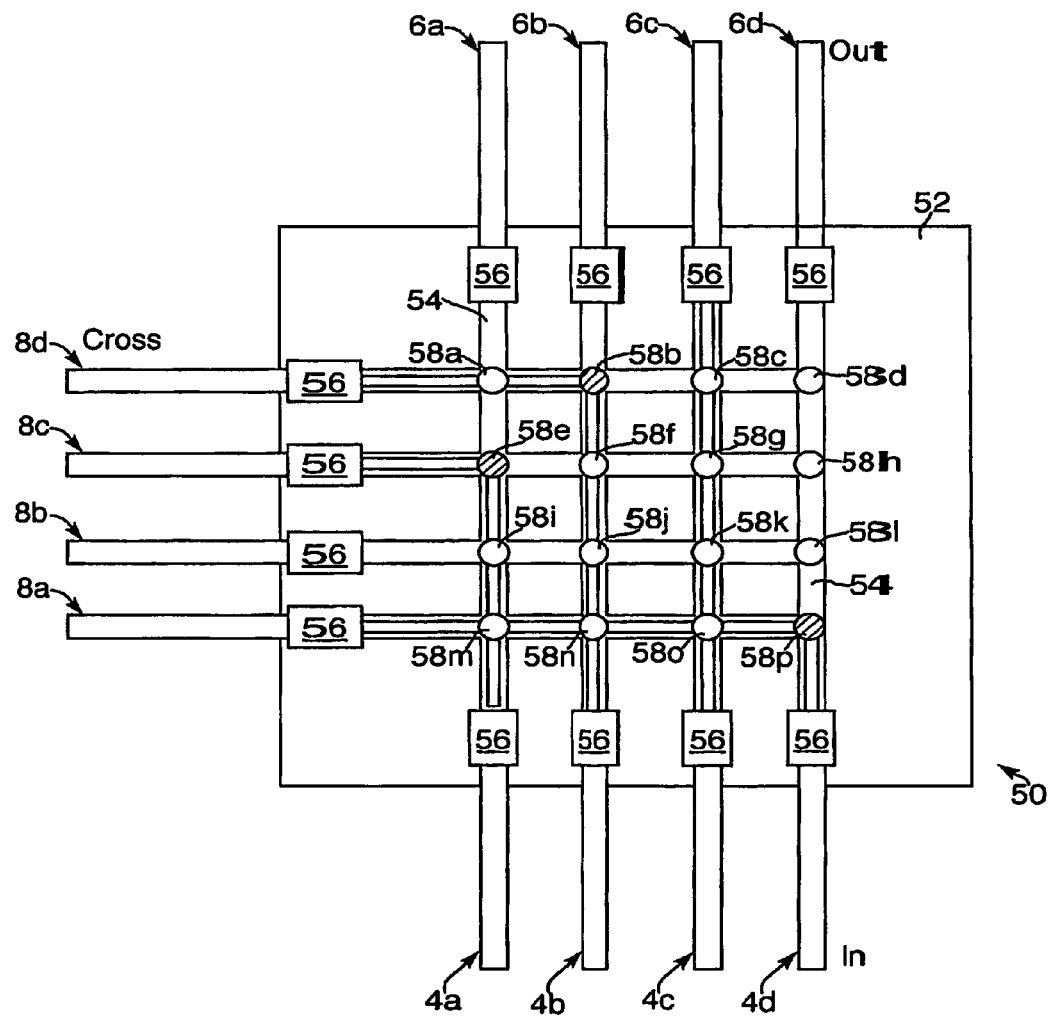
FIG. 2 shows a matrix switch of the present invention.

Referring to FIG. 2, a matrix switch 50 of the present invention is illustrated. The matrix switch 50 is designed to provide the same optical routing function as the prior art device described with reference to FIG. 1.

The matrix switch 50 comprises a silicon substrate 52 having a number of rectangular cross-section channels 54. The attachment of a lid portion (not shown) to the substrate defines hollow core optical waveguides. Lenses 56 are provided to optically couple the hollow core waveguides of the substrate to input optical fibres 4, output optical fibres 6 and cross-connect output optical fibres 8.

An array of reflective MEMS components 58a-58p (collectively referred to as the MEMS array 58) is also provided. The components of the MEMS array 58 comprise reflective surfaces that may be inserted into the hollow core optical waveguides to provide redirection of light propagating down a particular waveguide channel. The MEMS components may comprise pop-up mirrors of the type described by Wood et al and described with reference to FIG. 1 above. Alternatively, the MEMS components may comprises reflective shutters and associated MEMS actuation means to move the shutters into and out of the hollow core waveguides of the substrate as appropriate.

A benefit of using such MEMS devices, which may be integrally formed with the hollow core waveguide, is the high degree of mirror alignment that can be obtained by forming the MEMS device in the material surrounding the hollow core waveguides. In addition, the hollow core waveguides reduce diffraction effects and thereby increases the overall optical efficiency of the device.

Referring to FIG. 3, a further matrix switch 100 according to the present invention is shown. In common with the device of FIG. 2, the device comprises a silicon substrate 52 having a number of rectangular cross-section channels 54 formed therein to define, in combination with an appropriate lid portion (not shown), multi-mode hollow core, optical waveguides. An array of reflective MEMS components 102a-102p (collectively referred to as the MEMS array 102) is also provided. Input optical fibres 4, output optical fibres 6 and cross-connect output optical fibres 8 are arranged to implement the two-dimensional matrix switch routing function described above.

The components of the MEMS array 102 are located in a regular four-by-four grid arrangement in which each row and column of components is separated by the distance "a". The ends of each input optical fibre 4, each output optical fibre 6 and each cross-connect output optical fibre 8 are also located a distance "a" from the associated component of the MEMS array 102.

The arrangement of the matrix switch 100 is dimensioned to exploit the so-called "re-imaging" phenomena that is found with multi-mode waveguides. The length "a" is selected to be the re-imaging length (or a multiple thereof) of the hollow core waveguide such that, for a multi-mode waveguide of given cross-section dimensions, an image of the input beam profile is reproduced in the vicinity of the components in the MEMS array 102.

The re-imaging effect is described in more detail elsewhere; for example see PCT patent application GB2003/000331. In short, it has been found that multi-Mode waveguides (in particular those with a rectangular cross-section) can be designed to provide re-imaging of symmetric, anti-symmetric or asymmetric optical fields of a given wavelength by designing the length of the waveguide to have an appropriate relationship to its width and depth. In other words, the Gaussian input profile of a input beam is re-imaged (i.e. reproduced) after propagating a certain distance along a given waveguide. This effect also gives rise to beam replication; i.e. multiple images of the beam being formed at distances shorter than the re-imaging length. These effects have been described previously in U.S. Pat. No. 5,410,625 and provides the basis for multi-mode interference (MMI) beam splitting devices.

As an example, consider a symmetric field in a square sectioned waveguide. This will have a re-imaging length that is given by the square of the waveguide width over the wavelength of the propagating radiation. Re-imaging of the symmetric field occurs at the re-imaging length and multiples of the re-imaging length.

For the case of a 50.0 µm wide hollow waveguide and 1.55 µm radiation, the re-imaging length is thus 1.613 mm. The symmetric field would be re-imaged at this length and also at integer multiples of this length, i.e. 3.23 mm, 4.84 mm etc. For example, a $TEM_{00}$ Gaussian input beam from a single mode optical fibre could be re-imaged at distances of 1.613 mm.

Alternatively, for the case of an asymmetric optical field, re-imaging occurs at eight times the length required for symmetric field re-imaging, i.e. at 12.09 mm for a 50.0 µm wide hollow waveguide. A mirror image of the asymmetric field is also formed at half this length i.e. at 6.05 mm. In particular, offsetting the input from the centre line of the multimode legion provides an asymmetric input that is re-imaged at pre-determined distances along the guide at an equivalent offset on either side of the centre line.

In the case of a rectangular waveguide where the depth and width of the waveguide are substantially different, the re-imaging lengths associated with the two waveguide cross-sectional dimensions (e.g. depth and width) are themselves different. However, by arranging that the relationship between the dimensions of the rectangular hollow waveguide is such that re-imaging is produced at identical lengths for the particular width and depth, any field can be re-imaged. Thus, a symmetric field can be re-imaged in a hollow rectangular waveguide by arranging that the re-imaging lengths associated with axes of width $w_1$ and $w_2$ to be identical.

The distance "a" in FIG. 3 corresponds to the re-imaging distance (or a multiple thereof) for a Gaussian light beam directly injected into the hollow core optical waveguide from the input optical fibres 4. It can thus be seen that images of the light beam injected into the hollow core optical waveguide by each input fibre 4 are provided in vicinity of the components of the MEMS array 102. FIG. 4 shows in more detail the light intensity field 122 in the region 120 of the device 100.

The arrangement shown in FIGS. 3 and 4 has the advantage that collimating means (e.g. lenses) are not required in order to couple light between the hollow core waveguides and the associated optical fibres. Furthermore, placing each component of the MEMS array 102 at a re-imaging distance further eases the acceptable angular alignment tolerances of the MEMS components. In addition; use of the re-imaging effect also reduces diffraction losses where the waveguide has to be broken in order to facilitate the location of a moveable reflective element.

Referring to FIGS. 5 and 6, the effect of angular misalignment of the reflective components on the coupling efficiency between sections of hollow core waveguide is shown.

FIG. 5 shows a silicon substrate 52 in which a first hollow waveguide 140 and a second hollow waveguide 142 are formed. A reflective element 144 is located in the waveguide and arranged to reflect light carried by the first hollow waveguide 140 into the second hollow waveguide 142. The reflective element 144 has a certain angular misalignment ($\partial \theta$) determined by the device manufacturing tolerances.

FIG. 6 shows the power coupling efficiency of a fundamental ($EH_{11}$) mode from the first hollow waveguide 140 to the second hollow waveguide 142 as a function of angular misalignment ($\partial \theta$) of a mirror 144. It can be seen that the acceptable angular alignment tolerances for efficient coupling between sections of hollow core fibre are greatly relaxed compared to the angular alignment requirements for a matrix switch of the type described by Wood et al; see, in particular, FIG. 4 and the associated description in Wood et al where mirror alignment accuracy better than 0.05° is considered necessary.

Although four by four MEMS arrays are described above, other arrays including linear (i.e. one dimensional) arrays could be used. In fact, the benefits of the invention are increased as the array size (and hence path length between input and output fibres) is increased. The use of hollow core waveguide devices of the type described above thus permits high order optical switches to be provided. It would also be possible to stack a number of devices of the present invention so as to form a three dimensional matrix array; light being coupled from parallel planes in hollow core waveguides or in free space. A number of techniques could be used to provide a reflector which is angled at around 45° out of the plane of the substrate so as to direct light in a direction orthogonal to the substrate; for example, monolithic reflectors could be provided by anisotropic etching of <100> silicon –9° off-axis or hybrid reflectors may be located in the substrate.

Hollow core optical waveguides may also be used to provide optical interconnects between multiple components formed on a chip or between multiple chips. For example, FIG. 7 shows a silicon substrate 200 that comprises a plurality of channels defining hollow core optical waveguides 202. The hollow core waveguides 202 of the substrate 200 are used to connect the twelve optical outputs of a vertical cavity surface emitting laser (VCSEL) 204 to twelve corresponding detector elements of an InGaAs detector array 206. Although by no means essential, the hollow core optical waveguides may be dimensioned so that re-imaging of the input field produced by each VCSEL occurs at the detector element.

Referring to FIG. 8, a semiconductor substrate 210 is shown that comprises hollow core optical waveguide channels 211 and a plurality of pop-up MEMS mirrors 212. This arrangement provides a matrix switch of the type described in more detail above. The matrix switch can be used to route light from each element of the VCSEL array 204 to a detector element of either a first detector array 206 or a second detector array 208. In this manner, the optical interconnects between the various components of the chip can be readily re-configured.

FIG. 9 shows an exploded cross-sectional view of the device of FIG. 8 along line I-I. It can be seen that the VCSEL array 204 and the first detector array 206 are integrally formed on a chip 218 using known fabrication techniques. The semiconductor substrate 210 is combined with a lid portion 216 which together define hollow core optical waveguides 211 in the plane of the substrate. Angled mirrors 214 are provided in the substrate 210, and hollow waveguide portions 220 are provided through the lid 216, to enable light to be coupled to/from the components on the substrate into the plane of the matrix switch. In this manner, re-configurable intrachip optical connections are provided. A skilled person would appreciate that optical coupling arrangements of this type may be used to optically connect two or more chips or to provide intra-chip optical connections between various components formed on a single chip.

The invention claimed is:

1. An in-plane optical routing device comprising:
a semiconductor substrate having at least one optical input,
a plurality of optical outputs, wherein said at least one optical input and said plurality of outputs lie in a single plane, and
an array of micro-electromechanical system (MEMS) moveable reflective elements, at least one of said MEMS moveable reflective elements comprising a monolithically formed MEMS moveable reflective element, and said array of moveable reflective elements being configurable such that light is selectively routed from any one optical input to said any one of two or more of said optical outputs via hollow core waveguides arranged to guide substantially all the light received at said any one optical input to said any one of said optical outputs.

2. A device according to claim 1 wherein the semiconductor substrate comprises silicon.

3. A device according to claim 1 wherein the semiconductor substrate comprises a silicon-on-insulator (SOI) based wafer.

4. A device according to claim 1 wherein said hollow core waveguides are formed in the semiconductor substrate using micro-fabrication techniques.

5. A device according to claim 4 wherein the micro-fabrication techniques include deep reactive ion etching.

6. A device according to claim 1 wherein the semi-conductor substrate comprises a base portion and a lid portion, the base and lid portions being arranged to define said hollow core waveguide.

7. A device according to claim 1 wherein said MEMS moveable reflective elements comprise a reflective coating.

8. A device according claim 1 wherein the internal surface of the hollow core waveguide comprises a reflective coating.

9. A device according to claim 1 wherein at least one MEMS moveable reflective element is a pop-up mirror.

10. A device according to claim 1 wherein at least one MEMS moveable reflective element is hybrid attached to the semiconductor substrate.

11. A device according to claim 1 wherein at least one MEMS moveable reflective element is moveable between a fully inserted position in which it protrudes into the hollow core waveguide, and a fully retracted position.

12. A device according to claim 1 wherein the MEMS moveable reflective elements are arranged in a regular array.

13. A device according to claim 12 wherein the array comprises sixteen or more MEMS moveable reflective elements.

14. A device according to claim 1 wherein the plurality of optical outputs include at least one through output and at least one cross output.

15. A device according to claim 1 wherein at least one of said optical input and/or said optical outputs comprise a means for receiving an optical fibre.

16. A device according to claim 1 wherein said hollow core waveguides have a substantially rectangular cross-section.

17. A device according to claim 1 wherein the hollow core waveguides are dimensioned to support fundamental mode propagation.

18. A device according to claim 1 wherein the hollow core waveguides are dimensioned to support multi-mode propagation.

19. A device according to claim 18 wherein adjacent moveable reflective elements are spaced apart by the re-imaging distance of the hollow core waveguide.

20. A device according to claim 1 wherein at least one of said optical input and/or said optical outputs comprise an out of plane reflector element.

21. An in-plane optical routing device comprising:
a semiconductor substrate having at least one optical input;
a plurality of optical outputs, wherein said at least one optical input and said plurality of outputs lie in a single plane; and
an array of micro-electromechanical system (MEMS) moveable reflective elements, at least one of said MEMS moveable reflective elements comprising a monolithically formed MEMS moveable reflective element, and said array of moveable reflective elements is configured such that light in said device is selectively routed from any one optical input to any one of two or more of said plurality of optical outputs, wherein said selectively routed light between any one optical input and any one of said optical outputs is substantially wholly within a hollow core waveguide.

* * * * *